United States Patent [19]

Oates

[11] 4,052,132
[45] Oct. 4, 1977

[54] METHOD AND APPARATUS FOR DRILLING FINE HOLES IN FRANGIBLE WORKPIECES

[76] Inventor: William L. Oates, Mount Harmony Road, Bernardsville, N.J. 07924

[21] Appl. No.: 630,189

[22] Filed: Nov. 10, 1975

[51] Int. Cl.$^2$ ............................................. B23B 35/00
[52] U.S. Cl. ..................................... 408/1 R; 408/3; 408/10; 408/17
[58] Field of Search .......................... 408/3, 17, 1, 10; 125/30

[56] References Cited

U.S. PATENT DOCUMENTS

| | | | |
|---|---|---|---|
| 2,638,084 | 5/1953 | McLaughlin | 408/1 |
| 2,736,296 | 2/1956 | Romine et al. | 408/17 X |
| 2,853,903 | 9/1958 | Hauser | 408/17 |
| 2,854,869 | 10/1958 | Hirvonen | 408/10 X |
| 2,885,914 | 5/1959 | Frank et al. | 408/17 X |
| 2,925,002 | 2/1960 | Finley et al. | 408/17 X |
| 3,351,047 | 11/1967 | Barker | 408/17 |
| 3,475,996 | 11/1969 | Wheeler | 408/3 |
| 3,837,121 | 9/1974 | Schirmer | 408/17 X |

FOREIGN PATENT DOCUMENTS

| | | | |
|---|---|---|---|
| 1,199,626 | 12/1959 | France | 408/10 |
| 240,007 | 11/1945 | Switzerland | 408/17 |
| 621,559 | 4/1949 | United Kingdom | 408/10 |

Primary Examiner—Richard B. Lazarus
Assistant Examiner—W. R. Briggs
Attorney, Agent, or Firm—Martha G. Pugh

[57] ABSTRACT

A drilling system and method for use on thin frangible workpieces, such as watch crystals and the like, in which the speed of rotation and pecking motion of the drill are programmed to execute a preset schedule of changes with minimal human intervention.

In a preferred embodiment, the drill is mounted over the workpiece, which is pneumatically clamped on the work surface in a shallow water bath. The vertical pecking motion of the drill is under the dual control of a primary cable tensioned by weights on one end under control of a solenoid; and a secondary cable, the tension of which is responsive to the rotation of a master cam. The latter also initiates relay action for sequential operation of controls. The drill operates at an initial, relatively low rotational speed and a brisk pecking motion. At a preselected point near the lower end of the drill hole, the rotational speed of the drill is shifted to "high", and the pecking motion is slowed. Simultaneously, weights are lifted from the end of the primary cable, releasing the drill bit for the final slow descent through the remaining portion of the workpiece, reducing the possibility of breakout.

16 Claims, 37 Drawing Figures

FIG. 4A
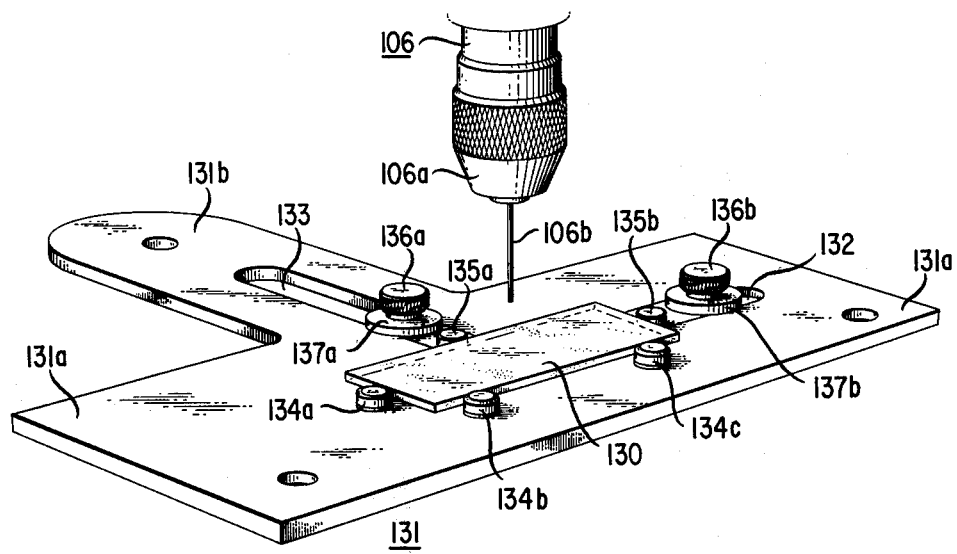
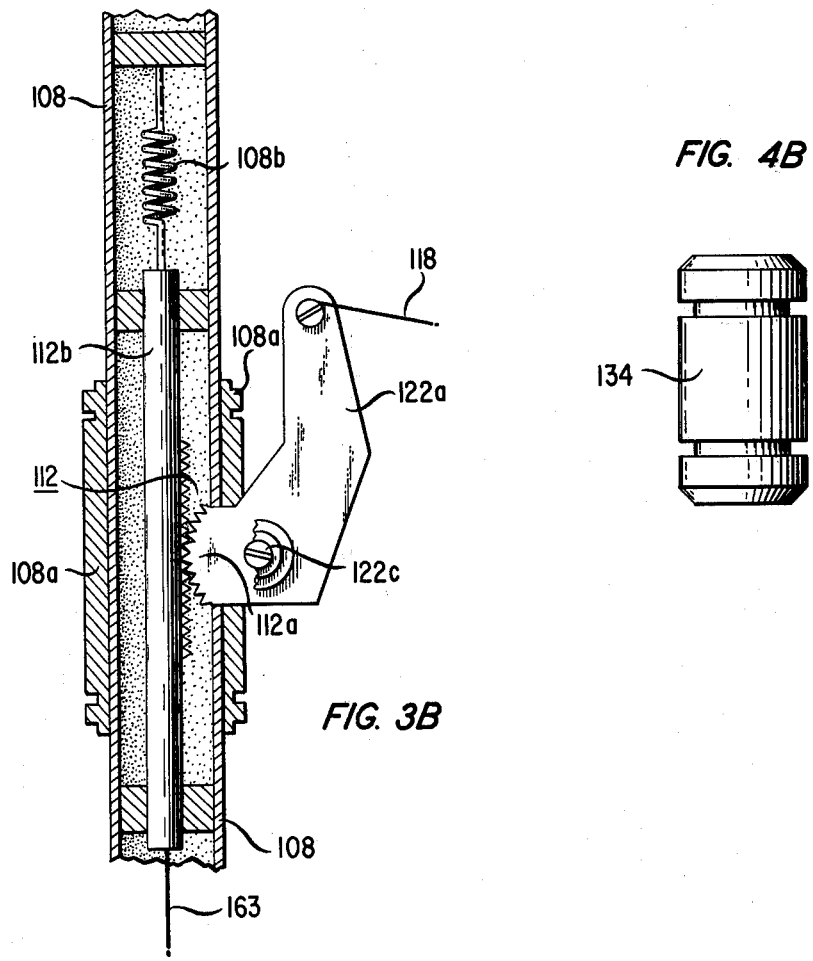
FIG. 4B
FIG. 3B

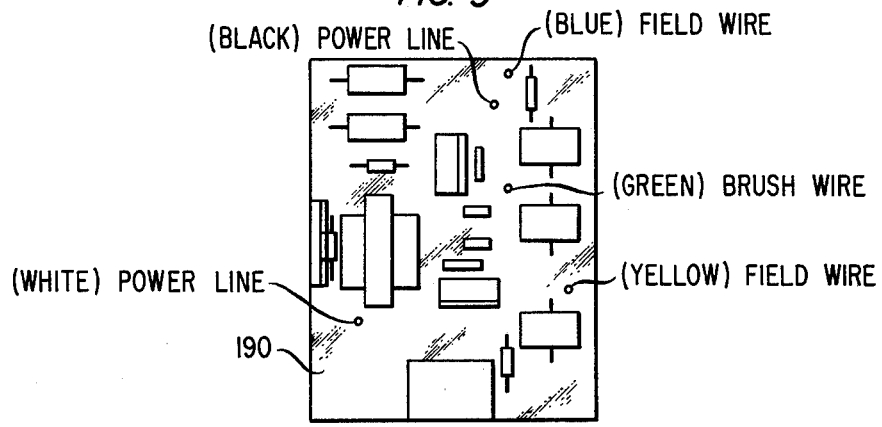
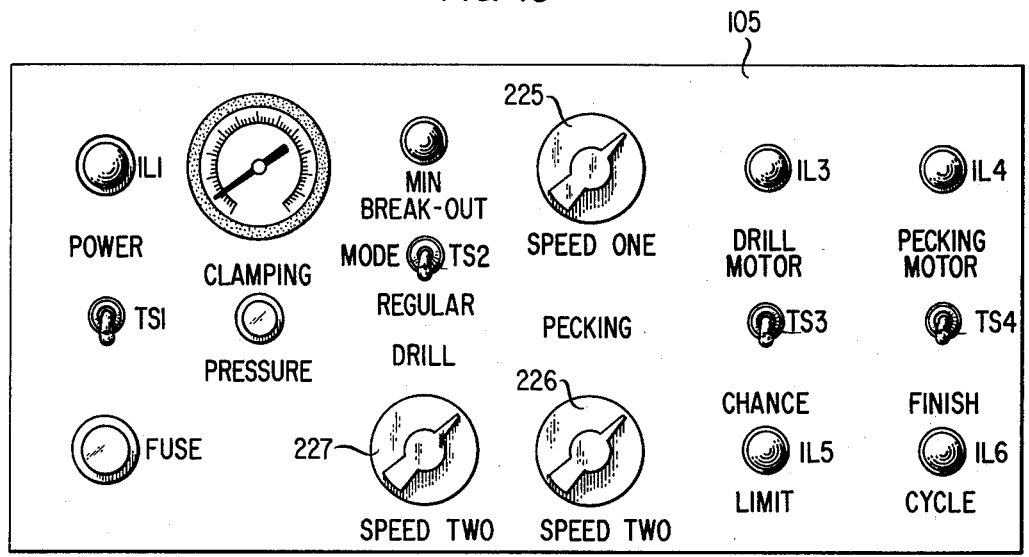
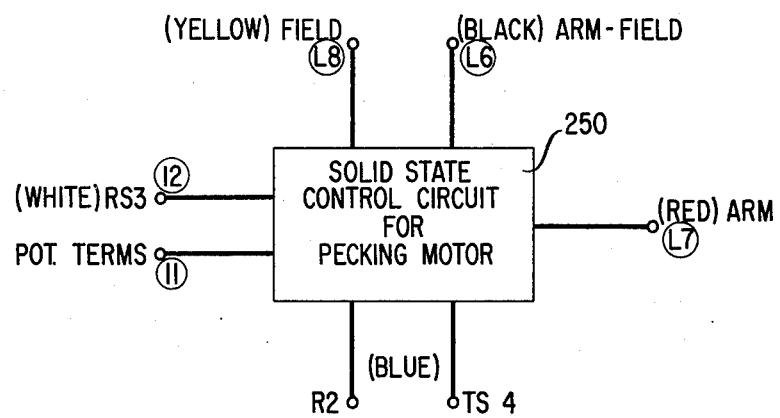

METHOD AND APPARATUS FOR DRILLING FINE HOLES IN FRANGIBLE WORKPIECES

BACKGROUND OF THE INVENTION

This relates in general to an automatic drilling system, more particularly for drilling fine holes in thin frangible workpieces such as, for example, watch crystals.

An obvious problem which has arisen with prior art devices of the type described is that the watch crystals, or other frangible plates, tend to be shattered or the hole being drilled tends to breakout during the drilling process. One method used in the prior art of avoiding such breakout is by the additional operation of waxing the bottom of the workpiece, and applying thereto a carbon substrate, for the duration of the drilling operation. Further disadvantages inherent in prior art processes are that they tend to reduce the life of the drill, increasing the expense of the process.

It has been found that the tendency of the workpiece to shatter or breakout is minimized and the life of the drill is maximized by carefully controlling the speed of rotation and frequency and extent of the pecking excursions of the quill during the drilling process. In order to control such an operation manually, a highly skilled operator must give it undeviating attention. If the operator becomes tired or careless, a high rate of broken workpieces results.

SUMMARY OF THE INVENTION

It is accordingly the principal object of the present invention to increase the efficiency and effectiveness of fine drilling systems, particularly of types which are designed to drill holes in thin fringible workpieces, such as watch crystals.

Another object of the invention is to provide a system and method for drilling holes in fringible workpieces which operate with a minimum amount of human supervision.

A further object is to increase the rate and uniformity of performing delicate drilling operations on frangible workpieces, while simultaneously reducing the number of rejects.

Another object of the invention is to enable a workpiece to be quickly and precisely positioned, and to be held in place securely for the duration of the drilling operation without the necessity of a carbon substrate.

A further object of the invention is to increase the life of the drill bit, which is particularly important in the case of expensive diamond drills.

These and other objects are realized in the drilling system of the present invention which includes pneumatic means to precisely clamp the workpiece in position to be operated on and, once operation of the drill is initiated, to automatically control the speed of rotation and pecking excursions of the drill as it passes through the workpiece in accordance with a preselected program.

In a preferred embodiment, the system comprises a rotary drill mounted over the work surface on which the workpiece is pneumatically clamped in a shallow water bath. The operator actuates an automatically latched handle to initiate operation of the system. A first driving means controls rotation of the quill to operate initially at a preselected low speed of rotation, which is automatically shifted to a substantially higher speed when the drill bit reaches what is known as the breakout point as it passes through the workpiece. Operation of the first driving means is synchronized with a second dual drive system which controls gravity operated means for alternately raising and lowering the drill bit from noncontacting to contacting position with the workpiece, called "pecking".

The drill bit assembly is supported for vertical motion in a sleeve in the drill head by means including a rack and pinion which operate against the tension of a primary cable supporting series of weights. Mechanically coupled to the raising and lowering means is a secondary cable, the tension of which is controlled by the rotation of a master cam to impose the pecking motion on the drill bit.

At preselected positions in the rotation of the master cam, a series of microswitches are triggered which initiate operation of relays and solenoids to perform the programmed functions. These include operations initiated at or near the breakout point to shift the initial rotational speed from a low of the order of 800 revolutions per minute, to a high of the order of 22,000 revolutions per minute. Meanwhile, weights are automatically removed from the primary cable, relaxing its tension; and the initial brisk pecking rate, based on a cam rotation rate of the order of 24 revolutions per minute, is reduced to a very low rate for the final descent of the quill through the workpiece. When the quill reaches just below its bottom position, a signal light is actuated and the handle is released, returning the drill to its initial condition. The operator then actuates the pneumatic clamp by means of a foot pedal to release the workpiece. Alternatively, this operation can also be performed by the automatic system.

A particular feature of the invention is that it provides a practically "foolproof" method of uniformly processing a large number of frangible workpieces without substantial breakage and with minimum supervision and without the inconvenience of waxing the workpiece to a carbon substrate.

An advantage of the drill system of the present invention is that its use substantially increases the life of the drill bit, which is economically significant, particularly in the case of diamond drills.

A further advantage in the use of the drill system of the present invention is that it reduces the occurrence of breakout in the underside of the workpiece, thereby increasing the quality of the work product.

These and other objects, features and advantages will be apparent to those skilled in the art by a detailed study of the specification hereinafter with reference to the attached drawings.

BRIEF DESCRIPTION OF THE DRAWINGS

FIG. 3B shows in detail the rack and pinion enclosed in support tube 108 of FIG. 3A;

FIG. 4A is an enlarged showing of the work surface of FIGS. 1-3B, showing the workpiece clamped into position;

FIG. 4B is a detailed showing of the retaining pins of FIG. 4A;

FIG. 9 is a physical layout for the control circuit for the drill motor, showing connecting points;

FIG. 13 shows connections for control of the direct current pecking motor;

FIG. 16 is a detailed showing of the control panel shown in FIG. 1;

DETAILED DESCRIPTION

Figure 1:
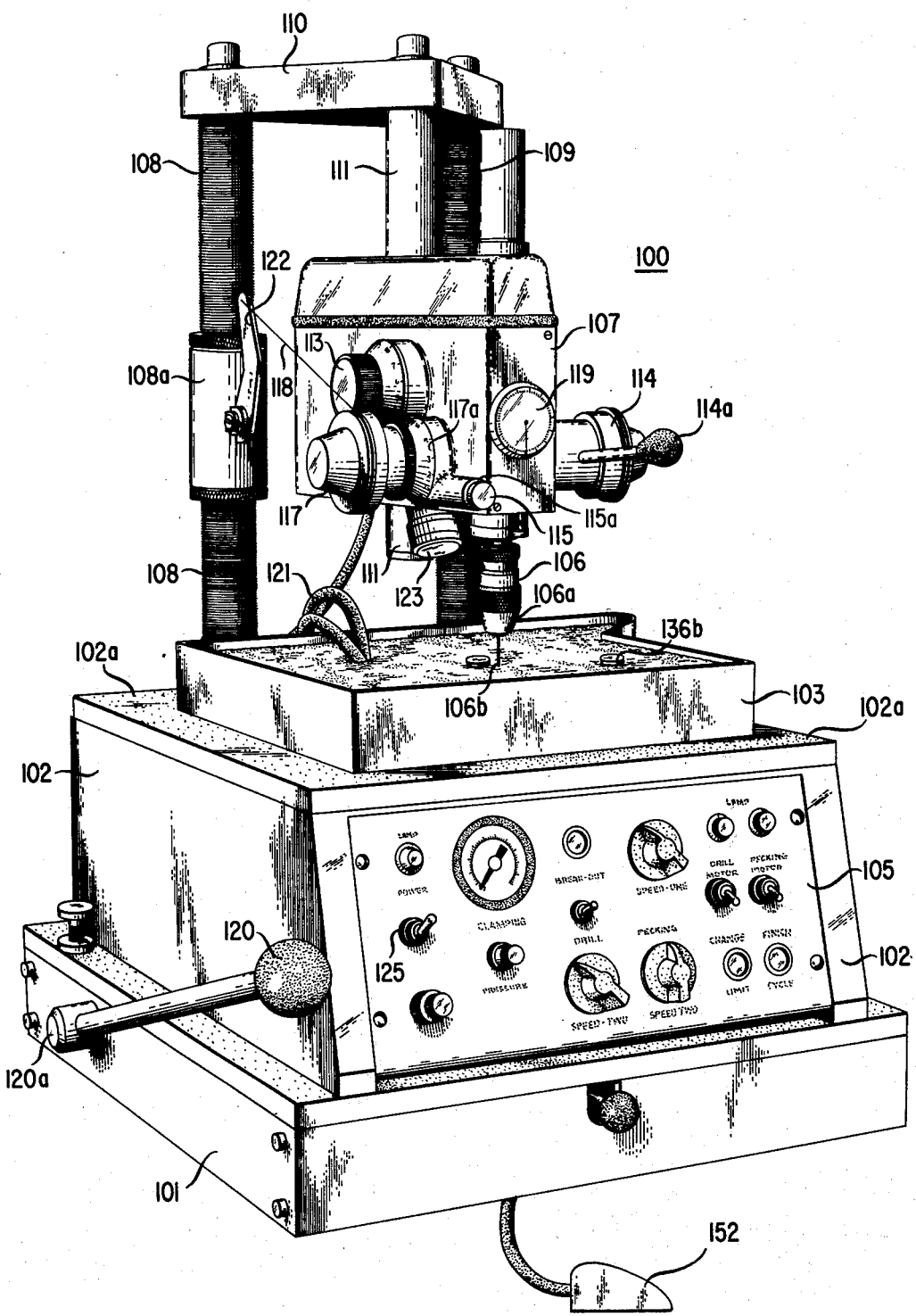
FIG. 1 is a front perspective view of the drill system of the present invention, showing the control panel with the lower portion of the housing closed.
Figure 2A:
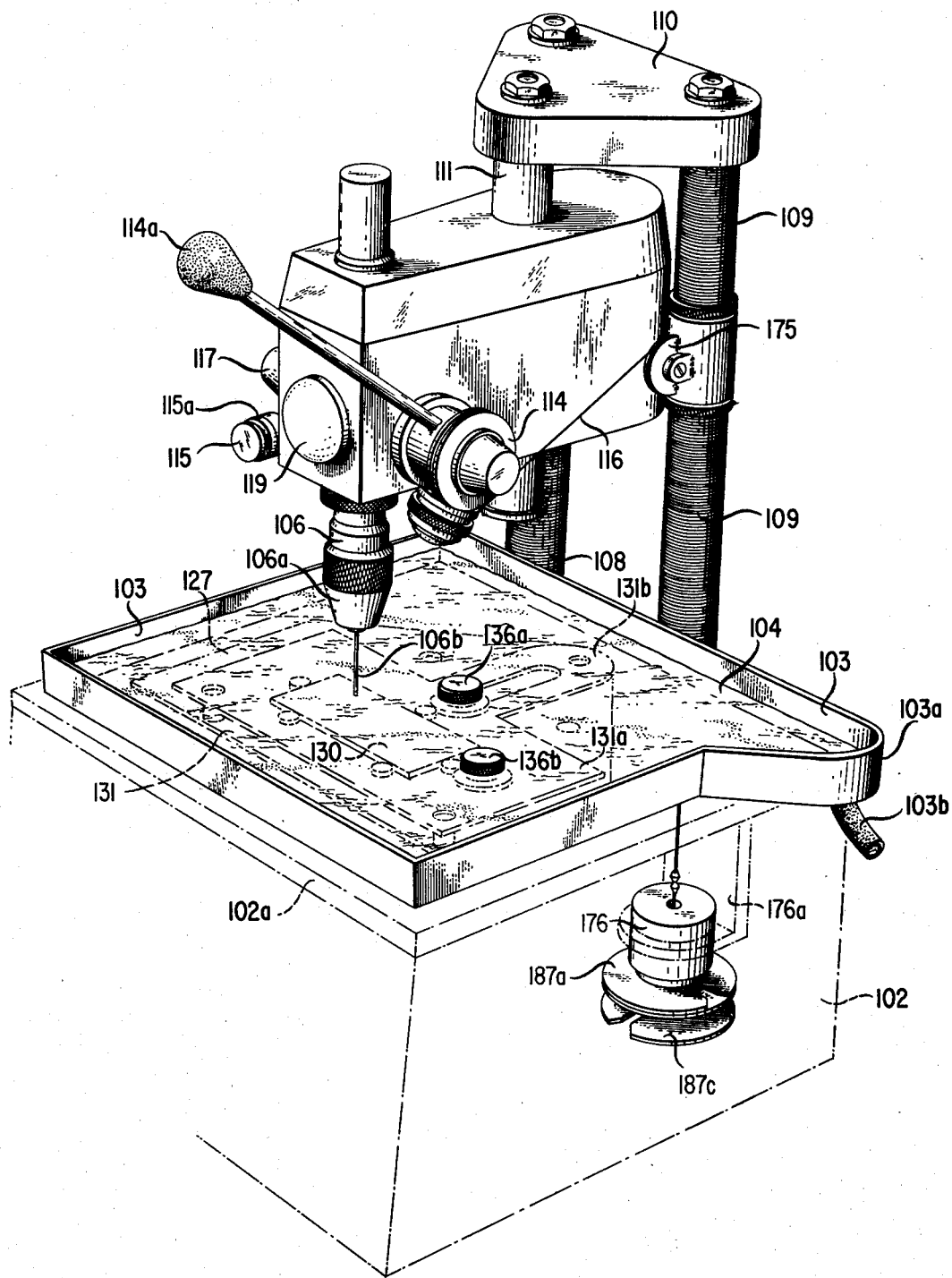
FIG. 2A is a perspective showing, viewed from the right side, of the combination of FIG. 1, looking down on the work surface, the housing open to show details of the solenoid system designed to control the tension on the cable which controls the up and down movement of the drill.

Referring in detail to the drawings, FIGS. 1 and 2A show overall views, from the front left and right corners, respectively, of the drill system 100 of the present invention for making holes from eight to 250 mils in diameter, in frangible plates, such as watch crystals. Drill 100 includes a rectangular supporting base 101 which supports a housing or cabinet 102. The latter is substantially rectangular in form, the control panel 105 being tipped inward from the vertical plane at a slight angle for optimum visibility.

On top of housing 102 is mounted a container 103 which, in the present embodiment, is roughly 1⅛ inches high, about 12 inches long across the front and 9 inches wide, except for a protruding lip 103a on the right-hand side. The latter serves for attaching a drain for liquid from bath 104 which covers the work surface to a depth of about one-sixteenth inch during the drilling operation. The work surface and clamp arrangement are described in detail hereinafter with reference to FIG. 4A of the drawings.

The drill assembly 106, together with housing 107 for the drill rotation, is suspended from a triangular mounting comprising two stainless steel tubes 108 and 109, about 1½ inches in outer diameter and one-eighth inch in thickness, supported on the top of housing 102, to the rear of water container 103. Tubes 108 and 109 extend vertically upward about 12 inches, being bolted or rivetted at their upper ends near the two rear corners of the triangular aluminum yoke 110. The upper end of a third steel mounting tube 111, similar in cross-section to tubes 108 and 109, is rivetted or bolted to an area near the apex of yoke 110. Tube 111 extends vertically down from yoke 110, engaging housing 107 in an internal shaft under control of a hand clamp, so that the position of housing 107 is vertically adjustable and is also rotatable in a horizontal plane about tube 111 as an axis. The drill mechanism 106 is of a type well-known in the art for drilling fine holes, including a drill bit 106b, one form of which is known as a trepanning drill, comprising a steel tube having an outer diameter corresponding to that of the hole being generated, and extending about one-half inch below the end of chuck 106a. The interior and exterior of the hollow drill bit 106b are impregnated with diamond dust, and may assume the form of a diamond plated core drill of any of the types well-known in the art.

Figure 2B:
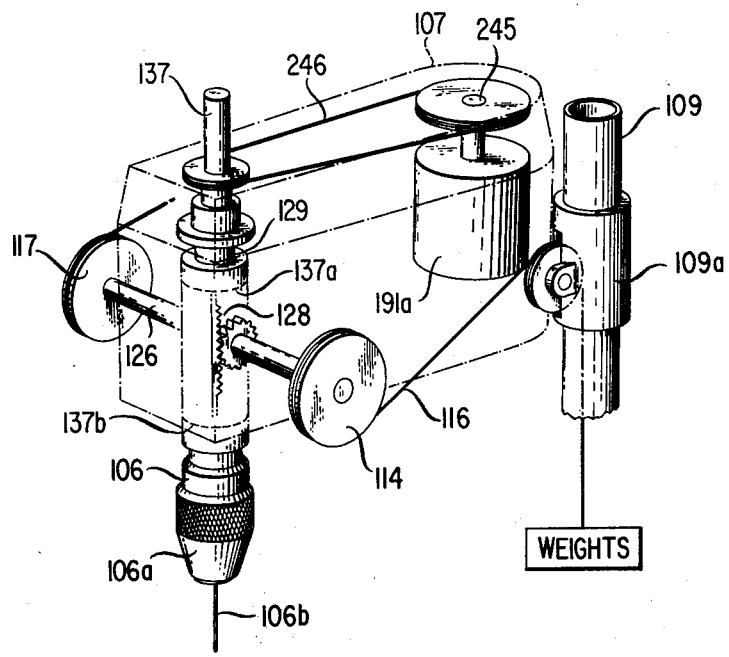
FIG. 2B is a showing of the drill assembly of FIG. 2A, indicating the raising and lowering mechanism for the drill.
Figure 6:
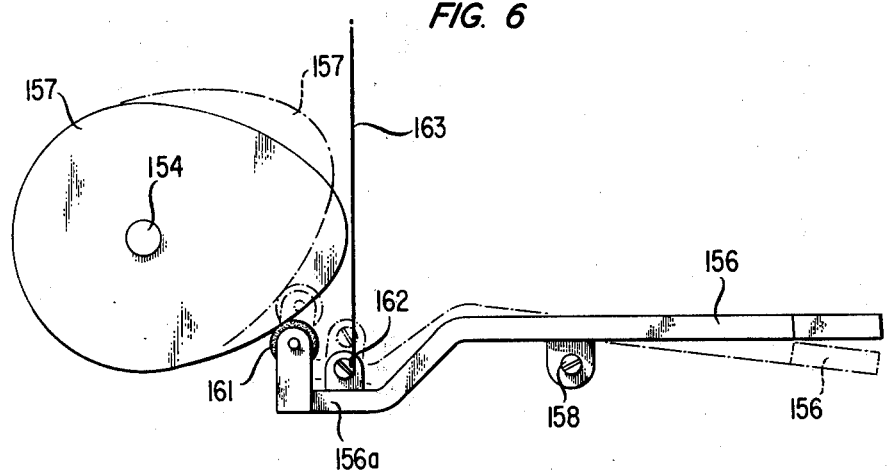
FIG. 6 is an enlarged detailed showing of the master cam and cam follower of FIG. 3A.

Referring to FIGS. 2A and 2B, the drill bit 106b is axially mounted in chuck 106a, which in turn is axially mounted on the end of a vertically disposed supporting shaft 137 which is mounted for rotation in sleeve 129. Shaft 137 is mounted in bearings 137a, 137b for rotation about its own axis, being designed for rotational speeds from about 800 to 22,000 revolutions per minute. The drill system, for example, may preferably be of a type sold by Servo Products Co., 540 West Woodbury Road, Altadena, Calif. 91001, as Model 1B, as set forth in its 1971 catalog DP101.

The shaft 137 is mounted for slidable to and fro vertical motion in sleeve 129 under control of a rack and pinion system 128 in housing 107. The rate at which drill bit 106b is raised and lowered and the pressure on the workpiece is gravity controlled by a system of weights connected to one end of cable 116, whose other end is attached to the hub 114. The weights can be displaced by a solenoid operated system to be described hereinafter in detail with reference to FIG. 7. The tension on cable 116 provides a preselected constant pressure on the drill bit 106b of the order of 8 ounces or so per square inch, when executing, for example, a one-sixteenths inch diameter hole. The hub 114 is rotationally coupled to hub 117 by axis 126, which operates for automatic cyclical control of the up and down motion of the drill by means of a cam actuated rack and pinion system connected to hub 117 by cable 118. (see FIG. 2B)

Additional accessories to the drill system include the following:

The calibrated scale 117a comprises a course depth indicator which records the position of the drill bit 106b as it passes through the workpiece.

Dial 113 provides the infinity adjustment for controlling the initial speed of rotation of the motor.

A spotlight 123 is focussed on the workpiece.

Knob 115, together with adjustable control 115a, provides a precision depth adjustable stop by limiting the downward excursion of the shaft 137 and, hence, of drill bit 106b, in the workpiece, as indicated by gauge 119. The operation of the stop mechanism will be explained more fully with reference to FIG. 17 hereinafter.

Automatic operation of the drill is initiated by turning on the power by means of toggle switch 125 on the control panel 105, and depressing operating lever 120, which causes clockwise rotation of a rod 120a, journalled in the base support 101 near the rear end.

Before the drilling operation is initiated, the workpiece 130 must be clamped in place on the supporting plate 131 by a pneumatically actuated clamping means, as indicated in FIG. 2A and shown in greater detail in FIGS. 4A, 4B, 5A, 5B and 5C. As shown in FIG. 2A of the drawings, the clamping plate 131 comprises a flat metal plate of, say, stainless steel or brass, 3/16 inch thick, taking the general shape shown in FIG. 4A of the drawings, which is supported on three standoff pillars, raising it about ¾ inch above the plate 127. For convenience of aligning the workpiece 130, plate 127 is clamped through the bottom of container 103, to the top of the machine housing 102, by means of screw studs surrounded by rubber 0-rings. The broad front edge of 131 is parallel to and centered about ½ inch in from the front wall of container 103. The front part of clamping plate 131 comprises a rectangle 131a, say, 9 inches across the front and about 3 inches wide. A protruding portion 131b, about 2½ inches wide, extends from the central portion of the rear edge of rectangle 131a, a distance of about 2½ inches along the central axis of clamping member 136a, to within about 1½ inches of the rear edge of container 103. Centered on the right-hand side of 131a is a rectangular slot 132, about 1½ inches long and ½ inch wide, with its right edge about ½ inch in from the corresponding edge of 131a. A second slot 133, about 1½ inches long and ½ inch wide, is centered in the protruding portion of 131b, with its rounded outer end about ½ inch removed from the end of 131b.

The position of workpiece 130 on the rectangular portion 131b of the clamping plate is partially defined by three fixed stainless steel position retaining pins 134a, 134b and 134c, of the form shown in FIG. 4B, each ¼ inch in diameter and of the general form disclosed in FIG. 4A. The central body portion of each pin conforms in thickness to plate 131, the upper and lower ends protruding 3/64 inch above and below an annular indentation 1/64 inch wide. Each of the retaining pins is disposed to press against an edge of workpiece 130 midway between the upper and lower face to prevent chipping. Pins 134b, 134c are aligned to bear against the long front edge of workpiece 130, whereas pin 134 is disposed to bear against its left-hand short edge.

Figure 5A:
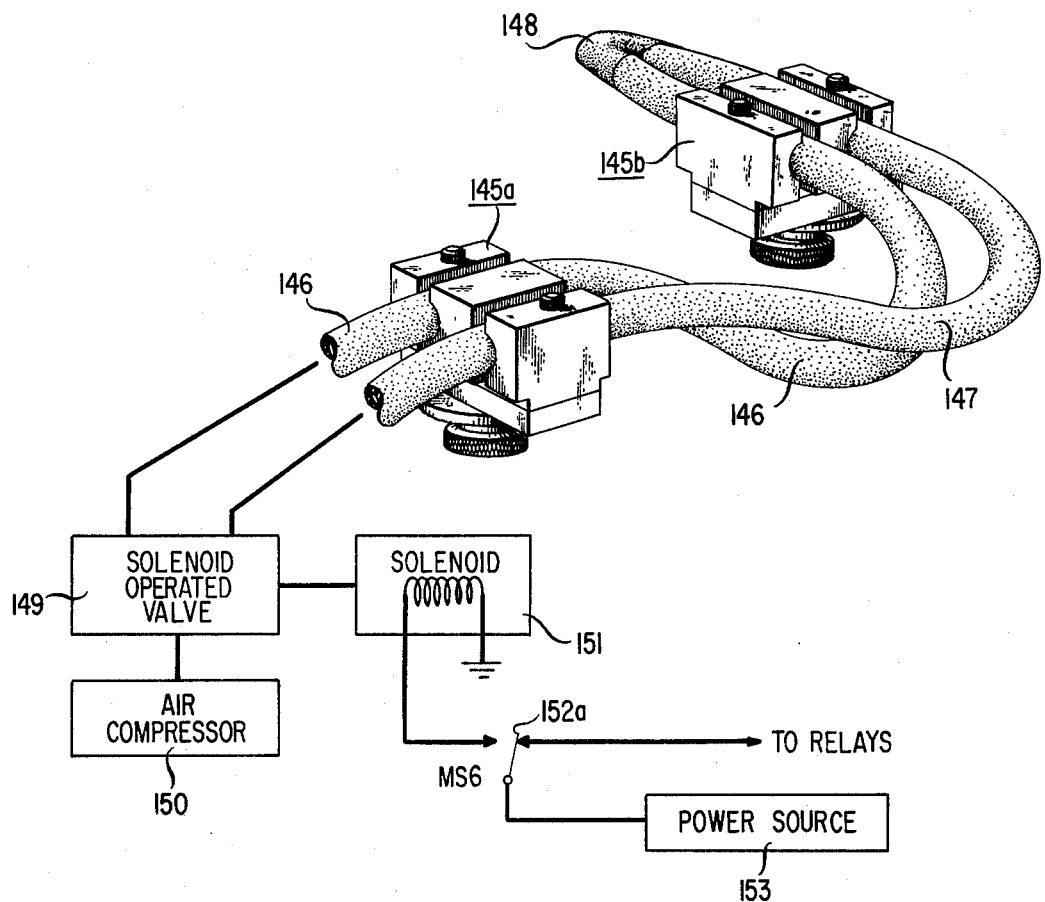
FIG. 5A is a detailed showing of the underside of the clamp of FIG. 4A.
Figure 5B:
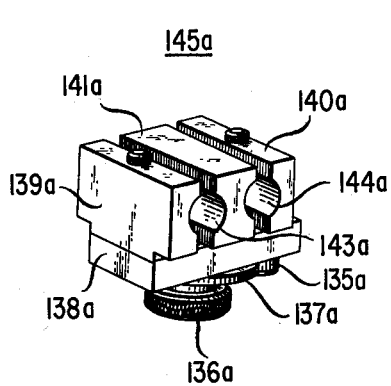
FIGS. 5B and 5C show in detail the pneumatic part locators of FIG. 5A.
Figure 5C:
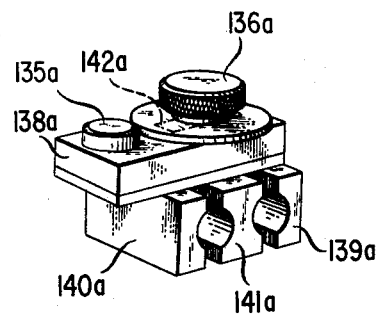

Workpiece 130 is locked into position by pneumatic operation of a pair of part locators 145a, 145b, which are respectively mounted to move slidably in slots 133, 132. Part locators 145a, 145b are as shown in FIGS. 5B and 5C, which show these elements upside down and right side up. In order to simplify the description, only the elements of part locator 145a will be described, as 145b is substantially identical.

Part locator 145a comprises a rectangular support block 138a of brass or other metal, dimensioned to slide in slot 133, and having a pair of rectangular legs 139a and 140a of the same material, screwed or otherwise rigidly secured at or near the block's two short ends. Legs 139a, 140a have narrow lateral shoulders which slidably engage the under edges of the slot. A round contact washer 135a is disposed near one end of block 138a so that its shank is anchored in leg 140a. Contact washer 135a protrudes through and moves to and fro on the upper side of slot 133 as block 138a slides back and forth in the slot, moving legs 139a and 140a in unison. Centered between and parallel to movable legs 139a, 140a is a third leg 141a, not connected to block 138a, which bridges the width of slot 133, and is secured by the annular plate of locking screw 136a in locked relation against the upper edge of slot 133. The shank of 136a passes down through 133 and a smaller elongated slot 142a in block 138a, and terminates in fixed leg 141a (FIG. 5C). Between each pair of legs 139a, 141a and 141a, 140a are formed semicylindrical bores 143a and 144a, which respectively accommodate pneumatic hoses 146 and 147. The latter hoses extend through both part locators 145a and 145b and terminate in a dead end blockage 148. The other ends of hoses 146 and 147, as shown in FIG. 5A, are connected to the solenoid actuated air valve 149, which is of a form well-known in the art. The latter is connected to a conventional air compressor 150 which supplies compressed air as needed. The valve 149, which is normally open to inflate hose 147, operates under control of solenoid 151 to inflate hose 146 and deflate hose 147. Solenoid 151 is energized by closing a normally open circuit through a foot pedal operating microswitch MS6 to a source of power 153.

Thus, when foot pedal 152 operates microswitch MS6, the latter is closed and solenoid 151 is energized, deflating hose 147 and inflating hose 146. This slides blocks 138a, 138b, moving the respective attached nylon contact washers 135a, 135b away from the center, to relax the clamp for placement of workpiece 130. Upon release of foot pedal operated microswitch MS6, blocks 138a, 138b move back in a reverse direction, forcing washers 135a, 135b against the respective edges of the workpiece 130, so that it is locked in position for the duration of the drilling operation.

Referring now in detail to FIGS. 3A, 3B, 6, 18A and 18B of the drawings, the mechanical operation of the master cam 157 and cam follower arrangement will be described, which controls the pecking operation of the quill 106b.

Figure 18A:
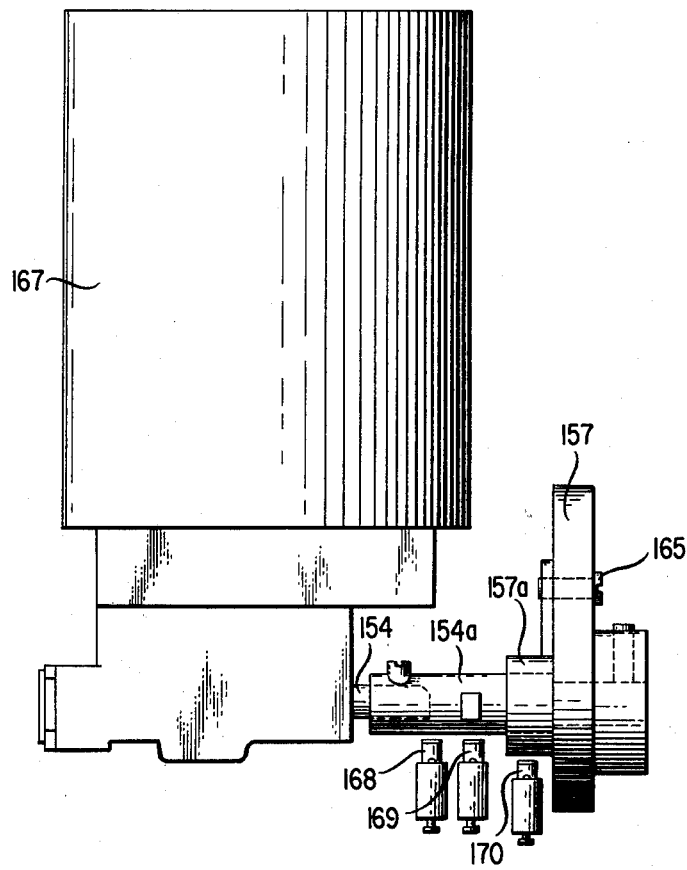
FIG. 18A shows the drive assembly for the master cam together with relay actuating means.
Figure 18B:
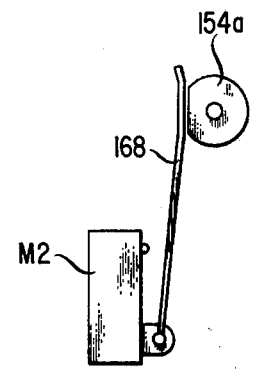
FIG. 18B is a detailed showing of the relay actuating means.

As shown in FIG. 18A, master cam 157 is driven to rotate by shaft 154 attached to the drive shaft of a conventional direct current motor, indicated by block 167. Riding on a portion 154a of enlarged radius of shaft 154, at intervals spaced apart, and on auxiliary cam 157a, are the operating levers 168, 169 and 170 for three microswitches, MS2, MS4 and MS3 (FIGS. 18A, 18B), the function and operation of which will be described hereinafter. Operating levers 168, 169 and 170 are put in operating position by contacting flattened areas on shaft extension 154a, respectively, and auxiliary cam 157a, in the case of lever 170. These flats are placed at precise positions in the cycle of cam 157, as will be described. Auxiliary cam 157a, on which operating lever 170 for microswitch MS3 rides, is disposed on the back of cam 157 and is rotated therewith.

Cam 157 is formed from a steel plate ¼ inch thick and is elliptical in outline, having major and minor axes 2¼ inches by 1¾ inches and being journalled at a point 164 substantially coincident with one focus of the ellipse, for rotation in a clockwise direction by shaft 154. Fine adjustments can be made to the operational cycle of the microswitch MS3 by means of a set screw 165 riding in an arcuate slot 166. The precise correlation between operating positions of cam 157, the pecking excursions of the drill bit 106b and the operation of the various microswitches in the relay circuit will be described in detail hereinafter.

Figure 3A:
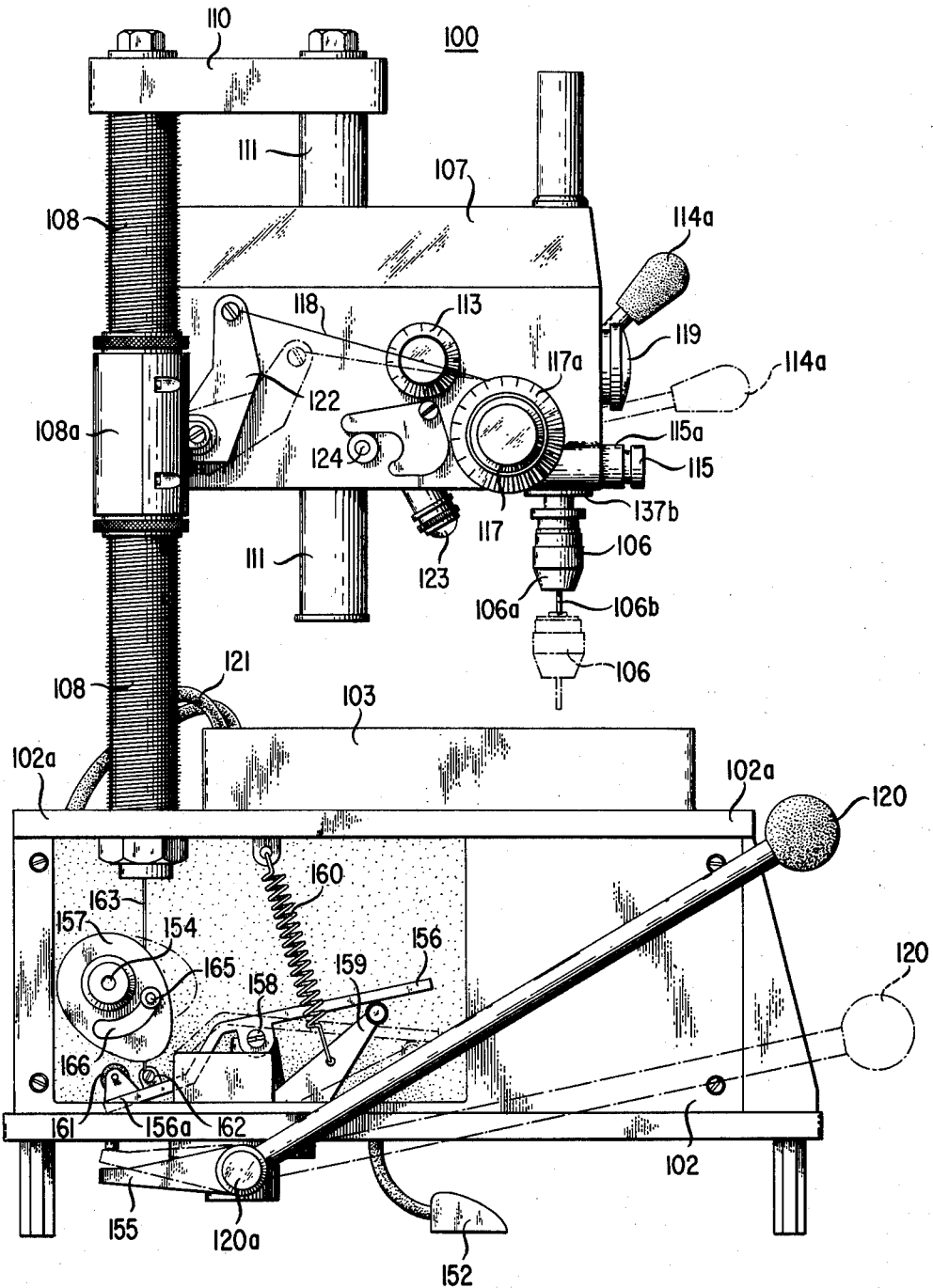
FIG. 3A is a left side elevational showing of the combination of FIG. 1, with the housing open to shown details of the master cam and cam follower mechanism.

In the initial or rest position, as shown in FIG. 3A, the lever 156 is in position shown in solid lines, being pivotted to move in seesaw fashion about pivot point 158. The portion of lever 156 to the right of pivot 158 comprises a flat steel plate, supported in initial upraised rest position by a roller at the upper end of support member 159, the center of which is connected by spring 160 to the frame of housing 102. The lower end of member 159 is rigidly fastened to lever 120, and moves down to the position shown in phantom when 120 is depressed, falling away from the lever 156, which assumes the operating position shown in phantom, whereby its left-hand end 156a, which is bent to form a foot extending beneath cam 157, moves up so that cam follower 161 is within contacting range of cam 157. Cam follower 161 is journalled in suitable bearing protruding above the surface of foot 156a, near its outer end. Supported at the center of foot 156a is a fastening member 162, to which is fastened a cable 163, so positioned that in responding to the up and down movements of lever 156, it does not contact or interfere with the free rotation of cam 157.

The cable 163 extends vertically upward through the tube 108 and is connected at its upper end to a conventional rack and pinion system 112, as shown in detail in FIG. 3B. In one embodiment, the rack 112b, of rack and pinion system 112, may be suspended from spring 108b, which is rigidly attached to an internal support in tube 108, so that rack 112b moves vertically against the tension of the spring. Pinion 112a is disposed to move rotatively about pivot point 122c when rack 112b moves up and down, thereby causing the arm 122a to rock back and forth in response to the changes in position of cam 157. Cable 118 is connected at one end to arm 122a, the other end being connected to the hub 117 which rotates axis 126, controlling the raising and lowering of drill bit 106b through a second rack and pinion system 128 in housing 107. This is shown in FIG. 2B. It will be understood that various types of mechanical systems well-known in the art can be substituted for the rack and pinion system 112 for translating the excursions of cam 157 to rotation of the axis 126, and for translating the rotation of axis 126 to up and down excursions of drill bit 106b.

In addition to the cable 118 just described, which controls the rotation of axis 126, the second cable 116 is connected at one end to the hub 114, the rotation of which controls the tension on the drill bit 106b, as shown in FIG. 2A. The other end of cable 116 passes over pulley 175, which rotates in a vertical slot in the hollow support tube 109, permitting the cable to drop vertically down to coupling 178 on which is fixed an extension 179 comprising a brass rod.

Figure 7:
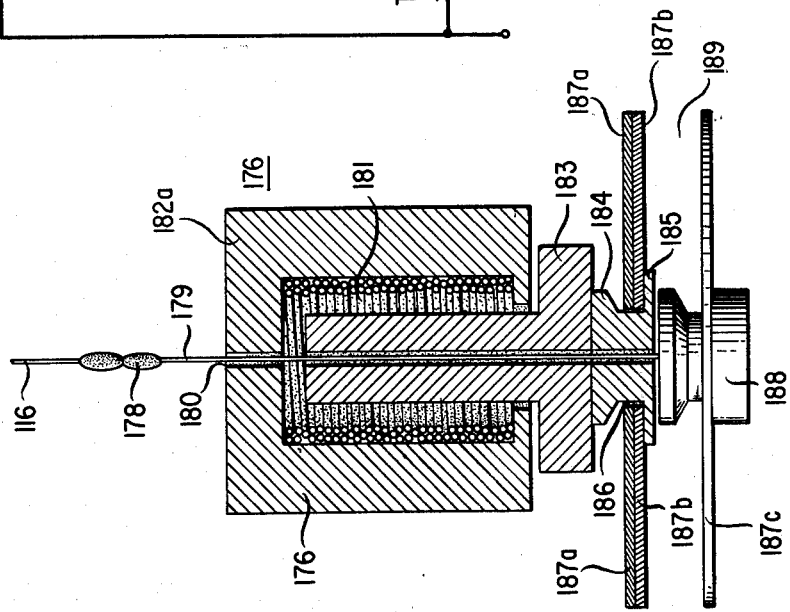
FIG. 7 is an enlarged detailed showing of the weight control solenoid of FIG. 2.

Cable extension 179 passes down through the central bore 180 in a conventional solenoid assemblage 176, shown in detail in FIG. 7, which comprises an energizing winding 181 in a soft iron yoke 182a. Solenoid 176 is rigidly supported at the base of the left-hand rear portin of housing 102, as shown in FIG. 2A. Interposed inside of the coil 181 is an annular soft iron core which terminates at its lower end in a soft iron annular armature 183. To its lower end is bonded annular brass hub member 184, which has a flat annular plate 185 at its lower end. Hub 184 supports a pair of brass annular weights 187a, 187b, slotted in the conventional way to allow them to be placed on and off. When solenoid 176 is energized, yoke 182a engages the armature 183.

Supported at the lower end of cable extension 179 is a second, larger solid hub 188 having a lateral annular recess 189. In operated condition of solenoid 176, brass hub 188 hangs free with its upper face below the lower face of the annular hub 184. A third brass weight may be optionally placed in the recess of hub 188, depending on the tension it is desired to place on the quill 106b.

When the solenoid 176 is deenergized, armature 183 drops away from the lower face of yoke 182a, together with hub 184, weights 187a and 187b and, optionally, 187c, so that the armature, hub and weights are fully supported by the cable 179, extending from cable 116, substantially increasing the tension on the latter. When the solenoid 176 is energized, the armature, weights and hub assembly 184 are lifted off of hub 188 allowing hub 188 to swing free on cable 179, so that the tension on cable 116, as transmitted to drill bit 106b, is reduced.

It will be noted that bead 178 should be disposed sufficiently above the top of yoke 182a to permit the full pecking stroke of drill bit 106b.

Figure 17:
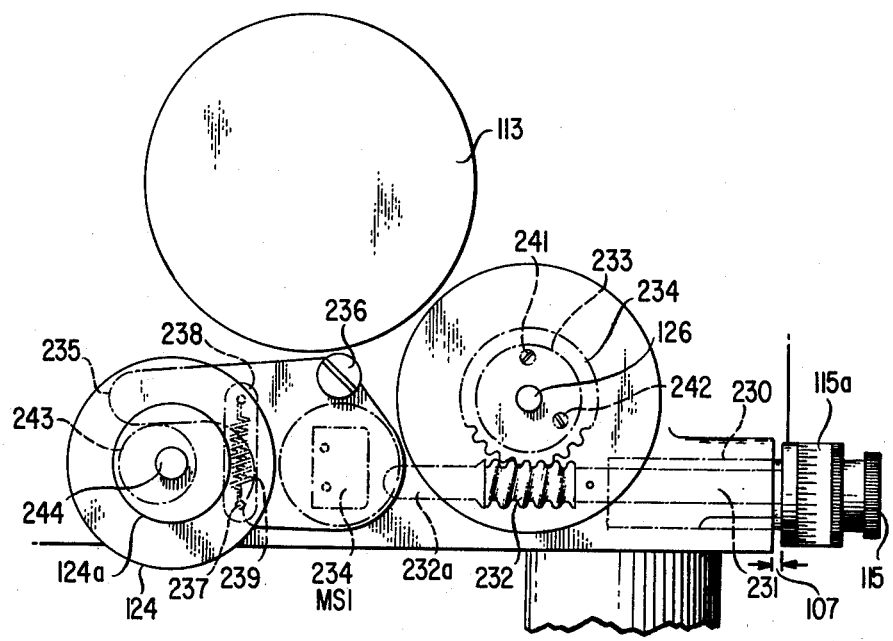
FIG. 17 is a detailed showing of the stop mechanism for limiting the vertical excursions of the drill bit of FIG.1, et seq.

FIG. 17 of the drawings is a detailed enlarged sectional showing taken just to the left of the vertical diametrical plane of fine depth adjustment dial 115, shown on FIG. 3A.

The dial 115 is mounted on a sleeve 230 which extends about one inch to the left in a bore which is part of the casting of drill housing 107. Coaxial with sleeve 230 and dial 115 is a shaft 231 which extends about 1½ inches to the left, carrying worm 232 in a position to engage worm gear 234, mounted on and rotatable with shaft 126. Coaxial with worm gear 234 is a secondary pinion 233. Elements 233 and 234 each bear a stop, 241 and 242. The latter stop is prepositioned on the rear surface of worm gear 234, the relative angular position being adjustable initially by rotation of the dial 115, in order to set the maximum depth for he final excursion of drill bit 106b. Stop 241 is positioned on the mating surface of secondary pinion 233. The latter, being coaxial with pinion shaft 126, moves in a clockwise direction as drill bit 106b descends, so that when the two stops become engaged, 233 and 234 move in concert through a slight clockwise angle imparting movement to worm 232 and the shaft contact member 232a, to an extent limited in a lateral direction by face of housing 107. The latter is spaced apart a preset distance from 115a.

Microswitch MS1 is positioned in the path of contact member 232a.

A small cam 243 is disposed to rotate about a pin 244 attached to housing 107, being subject to manipulation by a knurled spin wheel 124, which may be locked in position by a lock-nut 124a. Knurled spin wheel 124 contacts one leg of pivot plate 235, rotating it about pivot point 236. Microswitch MS1 is mounted on pivot plate 235, so that this operation moves the microswitch back and forth relative to contact member 232a. The purpose of this adjustment is to enable microswitch MS1 to operate in advance of contact between 115a and housing 107, which coincides with the lowest vertical excursion of the drill bit 106b.

Thus, by this mechanism the distance above the breakout point at which relay operation is initiated can be preset.

Figure 8:
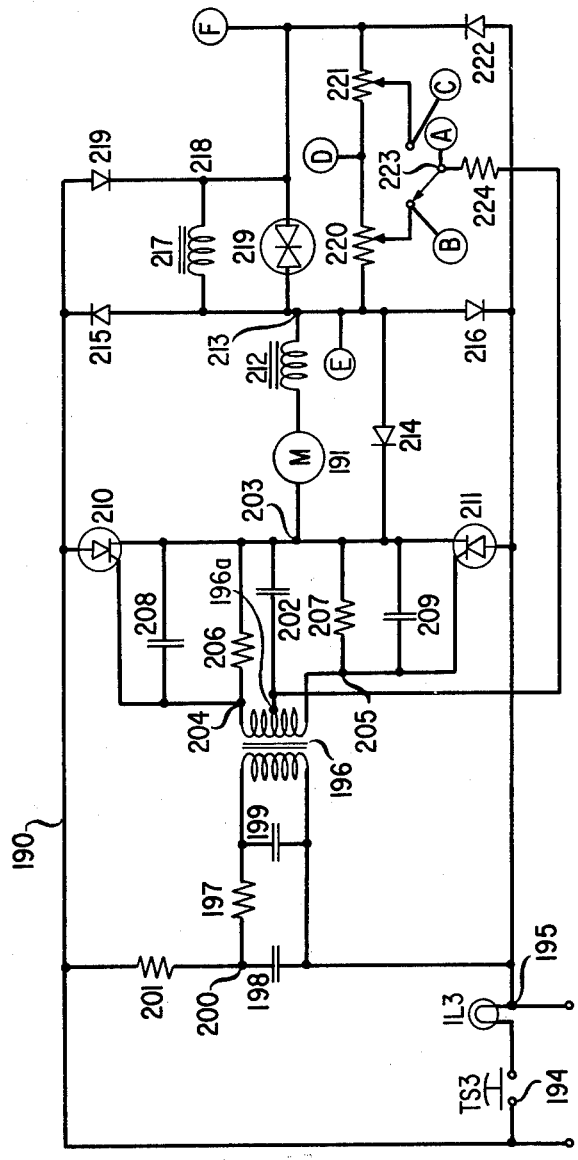
FIG. 8 is a circuit schematic of the control circuit for the drill motor of the system disclosed in FIG. 1.

FIG. 8 of the drawings shows in schematic a control circuit of a type generally suitable for operating drill motor 191, which is coupled to drive drill bit 106b in rotational motion. This circuit may be similar, for example, to a control circuit employed to operate a drill sold on the market by Servo Products of Altadena, Calif., which is described in their catalog No. DP101/1971 as Model No. 1B, except that it will include appropriate modifications at points in the circuit marked Ⓐ, Ⓑ, Ⓒ, Ⓓ, Ⓔ and Ⓕ, which will be described in detail hereinafter with reference to FIGS. 10, et seq.

The physical layout of the control circuit of FIG. 8, which may, for example, be a printed circuitboard of a type well-known in the art (FIG. 9), is designated 190; and the latter is physically located, together with additional circuitry to be described hereinafter, partly in drill head 107 and partly within the cabinet 102 behind the control panel 105 to which certain of the terminals are connected. The face of control panel 105 is shown in detail in FIG. 16.

Figure 10:
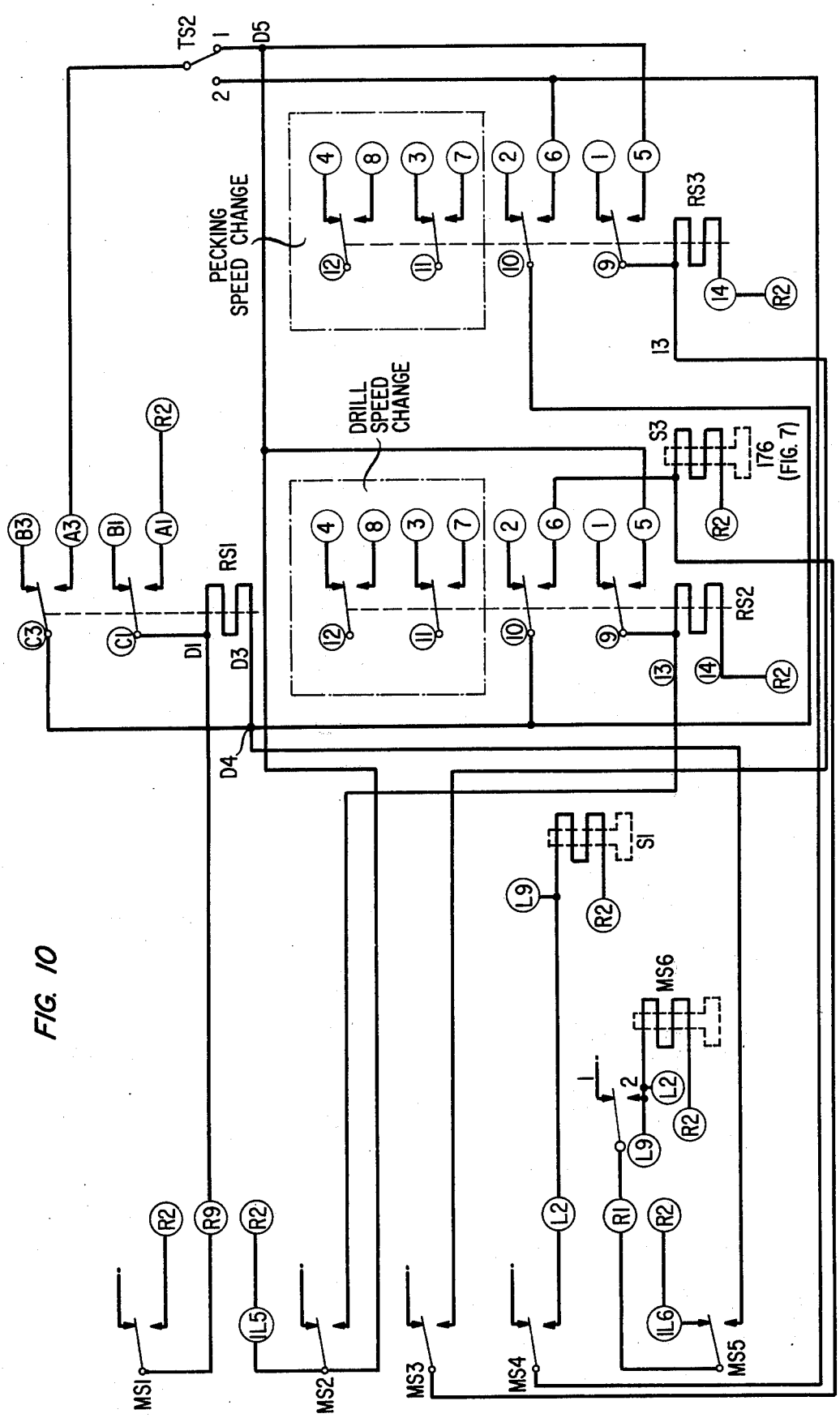
FIG. 10 is a circuit schematic of the overall relay and microswitch circuit for the drill system in accordance with the present invention.
Figure 11:
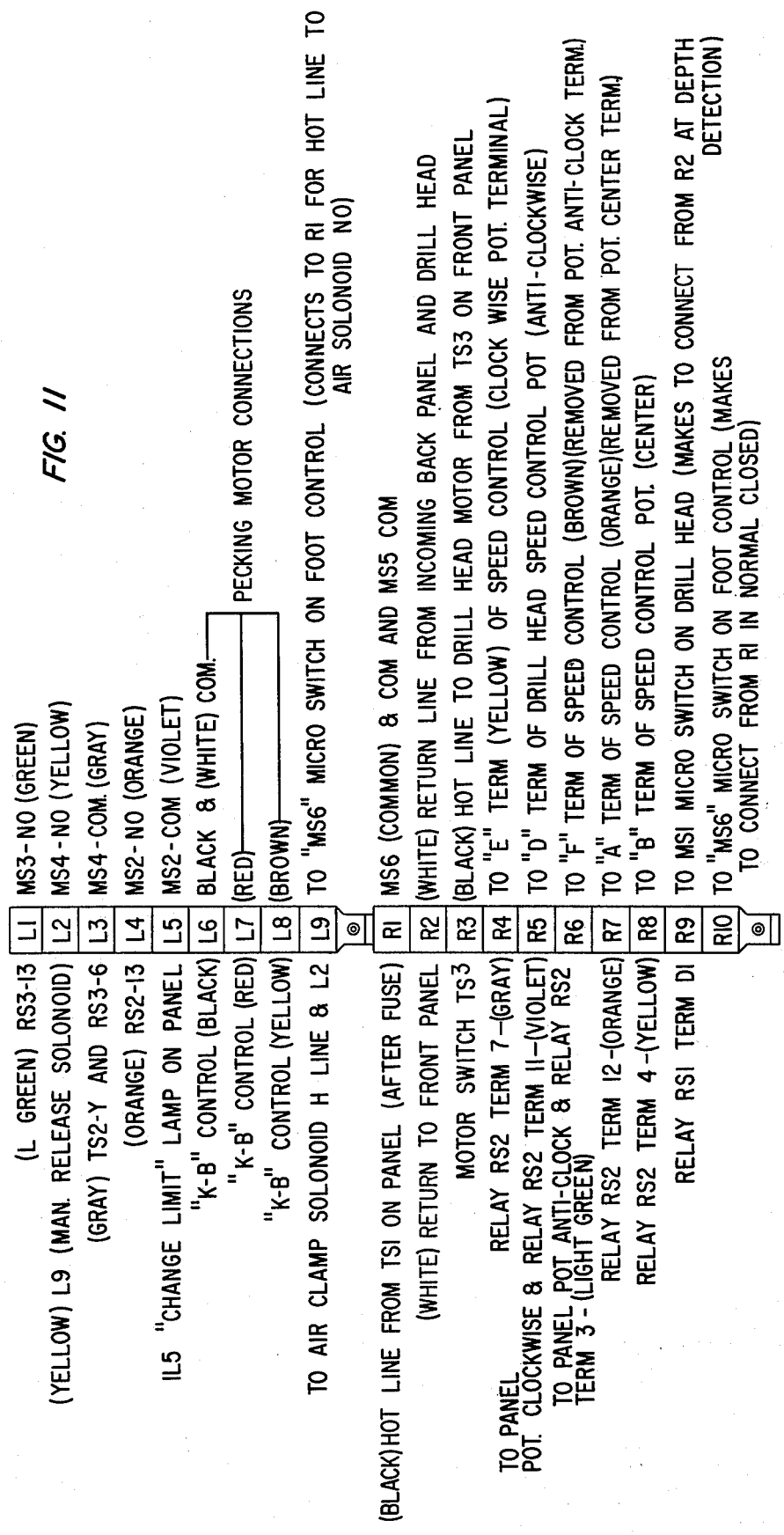
FIG. 11 is a schedule of the terminal connections for the microswitches and relays indicated in FIG. 10.

For ease of understanding connections to and from the circuits of FIG. 8 and the circuits of FIGS. 10, 12A-12I and 13, and the panelboard shown in FIG. 16, hereinafter, FIG. 11 shows a schedule of connections labelled L1-L9 and R1-R9.

Referring now in detail to FIG. 8, terminal lead 194 goes to terminal switch TS3 on panel 105; and terminal lead 195 goes to contact R2 (FIG. 11). Motor circuit 190 is thereby connected across a conventional alternating current source of power (not shown). Light IL3 is lighted when the circuit of FIG. 8 is closed, to put a spotlight on the work. Also connected across terminals 194 and 195 is a conventional alternating current stepdown transformer 196. Across the primary thereof is a conventional filter circuit which comprises a first 0.1 microfarad capacitor 199 and a second 0.33 microfarad capacitor 198, having their low potential terminals connected together to power terminal 195, and their high potential terminals connected to the terminals of a 62,000 ohm resistor 197. The junction 200 between 197 and 198 is connected through a 91,000 ohm resistor to the other power terminal 194.

The secondary circuit of transformer 196 is connected to the armature of motor 191 through the following circuit. The center tap 196a of 196 is connected through variable capacitor 202 to armature junction 203. The terminals 204 and 205 of the transformer secondary are respectively connected to armature terminal 203 through 1000 ohm resistors 206, 207, each respectively in parallel with a 0.02 microfarad capacitor 208, 209. The terminals 204, 205 are respectively connected to the collector electrodes of transistor triodes 210, 211, whose emitters are respectively connected to power terminals 194 and 195, the base electrodes being respectively connected together to terminal 203 of armature 191.

The other terminal of motor armature 191 is connected through the iron cored series field winding 212 to junction 213. In parallel with armature 191, between terminals 203 and 213, is disposed the rectifier 214. The positive terminals of a pair of rectifiers 215 and 216 are respectively connected to junction 213 and the negatives to power terminals 194 and 195. An iron cored shunt field coil 217 is connected between junction 213 and junction 218. This is connected in parallel with the gas filled diode 219, which is designed to provide a 25,000 ohm resistance across field coil 217.

Between terminals 213 and 218 (designated Ⓔ and Ⓕ for the purposes of this description), is connected a potential divider comprising a pair of 10,000 ohm resistors 220 and 221, connected between Ⓔ and Ⓓ and between Ⓓ and Ⓕ, respectively. Rectifier 222 is connected between junction Ⓕ and power terminal 195, and rectifier 216 is connected between junction Ⓔ and power terminal 195, so directed that current flows into the latter.

Relay switch 223 has one terminal (designated Ⓐ) connected through a 1000 ohm resistor 224 to the center tap 196a of transformer secondary. The selector of relay switch 223 is alternatively connected during the drilling cycle by cam actuated relay means, as will be described hereinafter, to points Ⓑ or Ⓒ. The latter are respectively connected to the variable wipers on resistors 220 and 221 of the potential divider between points Ⓔ and Ⓓ and Ⓓ and Ⓕ. When switch 223 is connected between Ⓐ and Ⓑ, the relay circuit provides a shunt between Ⓓ and Ⓕ and when switch 223 is connected between Ⓐ and Ⓒ the relay circuit provides a shunt between Ⓓ and Ⓔ.

It will be understood with reference to FIGS. 10, 11, et seq., hereinafter, that the switch which has been designated 223 on FIG. 8, in order to simplify the description of the circuit there shown, actually corresponds to the relay switch RS2 of FIGS. 10 and 12B; and that as to the connections to switch 223 shown in FIG. 8:

Point Ⓐ is connected to R7 (FIG. 11) which is connected to contact 12 of RS2;
Point Ⓑ is connected to R8 (FIG. 11) which is connected to contact 4 of RS2;
Point Ⓒ is connected to the central terminal of potentiometer 227 on panel 105;
Point Ⓓ is connected to R5 (FIG. 11) which is connected to terminal 11 of RS2; and also to the clockwise terminal of potentiometer 227 on panel 105;
Point Ⓔ is connected to R4 (FIG. 11) which is connected to terminal 7 of RS2; and
Point Ⓕ is connected to R6 (FIG. 11) which is connected to terminal 3 of RS2; and the anticlockwise terminal of potentiometer 227 on panel 105.

Referring to FIG. 10, there is shown the schematic of the control circuit including the microswitches, which are designated MS; the relays which are designated RS; and the solenoids, which are designated S.

By operating power switch TS1 on the front panel 105 (as shown in FIG. 16), power is applied to terminal R1 (FIG. 11). Power is supplied to switch TS1 through a conventional fused line leading to any conventional 110-volt alternating current outlet. When operating lever 120 is pulled, mechanically latching, it actuates MS5, connecting power to relay RS1.

Figure 12A:
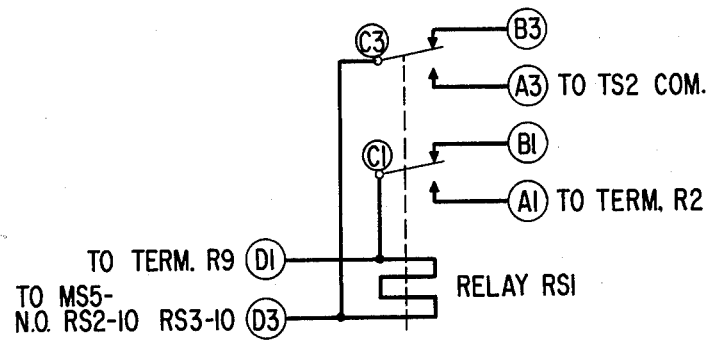
FIGS. 12A-12I are schematic showings indicating the connecting circuits to the individual relays and microswitches in the circuit of FIG. 10.
Figure 12B:
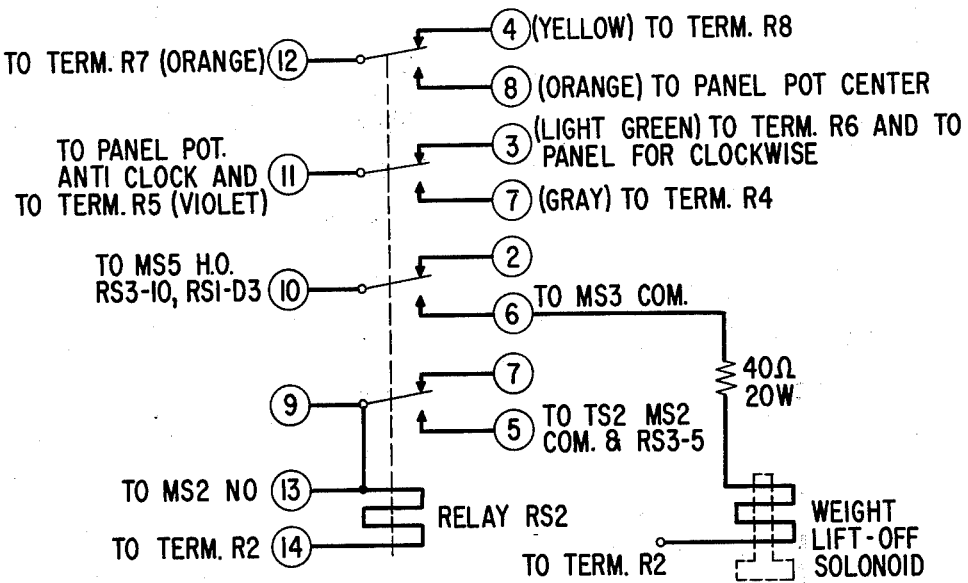
Figure 12C:
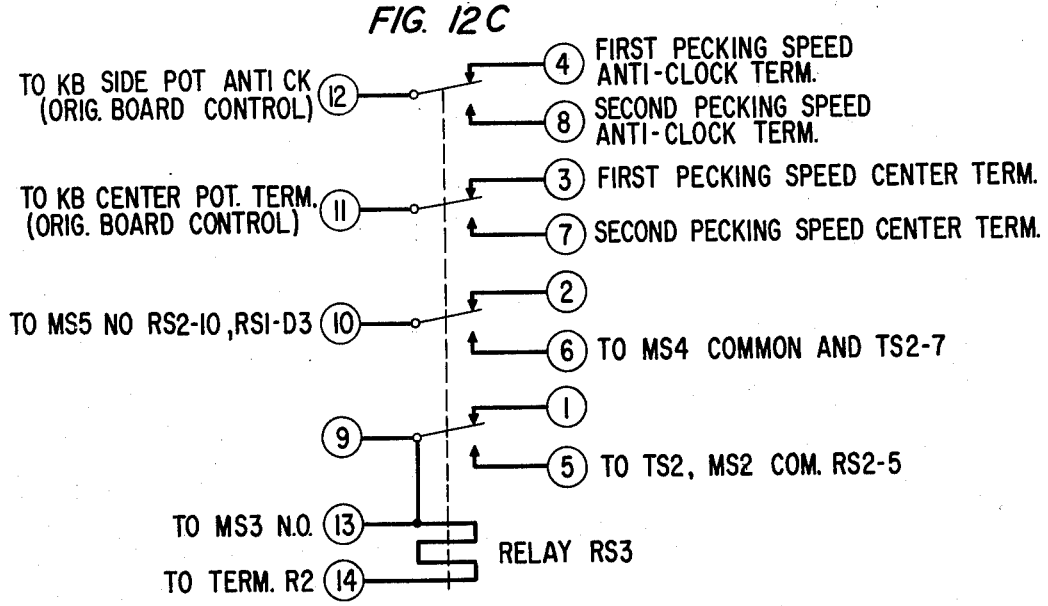
Figure 12D:
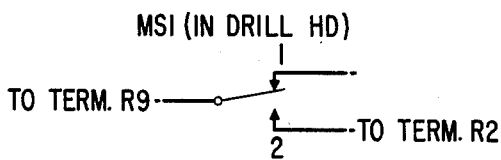
Figure 12E:
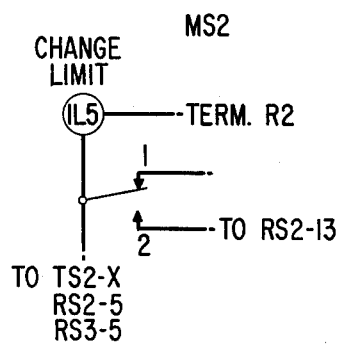
Figure 12F:
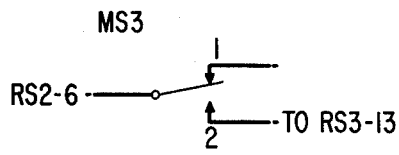

As drill bit 106b descends, reaching the anticipation point ahead of the breakout point, microswitch MS1 is triggered to operate, connecting ground from terminal R2 (FIG. 11) to energize relay RS1, which is self-latching through its contacts C1 and A1 (FIG. 12A). As pointed out with reference to FIG. 17, the operating point of breakout anticipator switch MS1, which is located in drill head 107, is adjustable by rotating knob 115, which will ordinarily be set to be triggered when the drill bit 106b reaches a point 10 or 15 mils above the work surface. MS1 can be adjusted to trigger at any point between those corresponding to 80° and 280° on master cam 157, to energize relay RS1. The cam angles are measured counterclockwise from point P (see FIGS. 14A-14E). RS1 is operated through an energizing circuit including powerline Ⓡ1, operated contacts of MS5, the coil RS1, D1 and ground return line Ⓡ2 through the operated contacts of MS1.

Operation of RS1 applies power to ready MS2 in advance of its operation, through a circuit which includes powerline Ⓡ1, the contacts of MS5, junction D4, RS1 operated contacts C3 and B3, contact 1 of switch TS2 and junction D5.

MS2 operates at the maximum vertical height of the drill bit 106b. It is located on pecking motor shaft 154 and is not adjustable; and is designed to trigger when the maximum lobe of cam 157 is coincident with cam follower 161 to energize relay RS2 (see FIG. 12B). As a result of operation of relay RS2:

I. Drill motor 191 is switched to high speed No. 2 by normally closed RS2 contacts (12) and (8), and normally closed contacts (11) and (7).

II. Weight lift solenoid S3 is actuated through a circuit which includes normally closed RS2 contacts (10) and (6), junction D4 and powerline (R1) through the operated contacts of MS5.

III. Power is connected to microswitch MS3 through a circuit which also includes RS2 contacts (6) and (10) and junction D4, to (R1) through the contacts of MS5, as previously described.

Microswitch MS3, which is located on the shaft of master pecking cam 157, is adjustable (FIG. 18A). The function of this switch is to initiate slow motion of the pecking cam 157 during final descent of the drill bit 106b toward the work surface. Switch MS3 is usually set to be triggered before the initial anticipator position of cam 157 is reached on the second rotation of the cam, when point P on cam 157 reaches an angle of 75° with cam follower 161 (measured anticlockwise), thereby energizing relay RS3 (see FIG. 12C). The latter is energized through the operated contacts of MS3, and a circuit which includes the operated contacts (10) and (6) of RS2, junction D4 and through the contacts of MS5 to powerline (R1).

As the result of the operation of relay RS3, the following actions occur:

I. Operation of pecking motor 167, which drives the master cam 157, is reduced to low speed for the final breakthrough of workpiece 130 by closing RS3 contacts (12) and (8), and (11) and (7), respectively (see FIG. 12C).

II. The powerline is connected to MS4 through the RS3 closed contacts (10) and (6), junction D4 and the contacts of MS5 to (R1), thereby making this circuit ready for operation.

Microswitch MS4, the handle release switch, is located on the shaft 154 of cam motor 167 and is not adjustable (see FIG. 18A). MS4 is set to trigger when point P on the cam 157 reaches 90° from cam follower 161 (anticlockwise), thereby energizing handle release solenoid S1 (see FIG. 12G). As a result of this, the following actions occur:

I. Spring biased handle 120 is automatically released to "up" position, thereby triggering operation of microswitch MS5 to its initial position, tripping the latching relays (L2) and (L9), and causing indicator light IL6 on panel 105 (FIG. 16) to show that the drilling cycle has been completed.

SUMMARY OF OPERATION

The embodiment herein described operates as follows:

Preliminary Steps

The automatic mode for operation of the drill system is selected by toggle switch TS2 (see FIG. 16), at which point indicator light IL2 will be lighted. The power to the system, the drilling motor and the motor to drive the pecking cam 157 are respectively turned on by means to toggle switches TS1, TS3 and TS4 on panel 105.

The operator then depresses foot pedal 152, causing locking members 135a, 135b of part locators 145a, 145b to open, to permit positioning of workpiece 130. Upon release of foot pedal 152, locking members 135a, 135b make contact with two edges of workpiece 130, securing it in place on the work surface 131, which is covered by a water bath 1/16 inch or more in depth. Starting lever 120 is then pulled down.

Figure 15A:
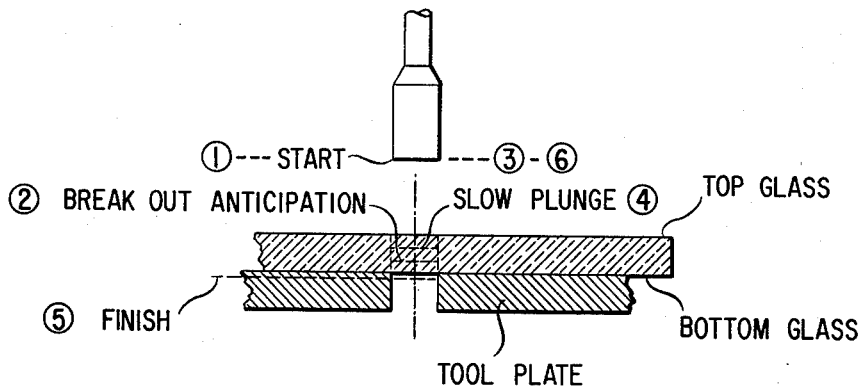
FIG. 15A shows the physical position of the drill bit relative to the work surface at various points in the cycle.

The operation of the system will now be described functionally, with reference to FIGS. 14A, 14B, 14C, 14D and 14E, which show various rotational positions of master cam 157 at different critical points in the pecking excursions of the drill bit 106b, whose physical positions are indicated in FIG. 15A. The vertical extent of the cyclic excursions of drill bit 106b are plotted graphically with reference to time in FIG. 15B.

Step 1

FIG. 15A shows the drill bit 106b at position (1), the topmost vertical position for the beginning of the drilling operation. The elliptical master cam 157 is rotating freely at this point, roller 161 being held away from contact because operating lever 120 is in "up" position, as held by spring 160. Cam 157 rotates clockwise.

At the starting position, the rotary drilling rate is initiated at a low speed of, say, 8000 revolutions per minute; and the rate of rotation of the pecking motor 167, which drives cam 157, is initiated at, say, 24 revolutions per minute. It will be understood that the rotary drilling rate can be adjusted over a range from 0 revolutions per minute to 22,000 revolutions per minute; and that the pecking rate is adjustable by dial 225 (FIG. 16) over the range 0 revolutions per minute to about 60 revolutions per minute.

The position of the anticipatory microswitch MS1 is preset by manipulating the dial 124 on the side of drill head 107, so that the switch will be triggered and operated at a position in which drill bit 106b is between 10 and 15 mils above the bottom of the surface supporting workpiece 130.

Figure 14A:
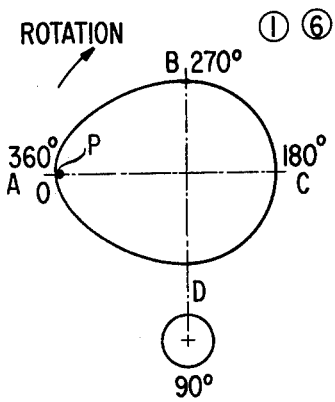
FIGS. 14A-14E show the cam positions at various points in the cycle.
Figure 14B:
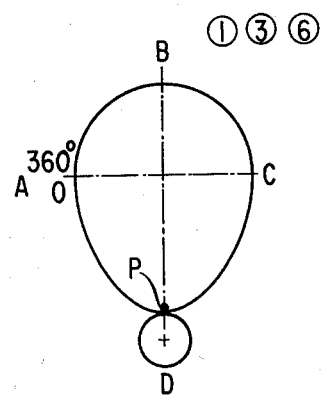
Figure 15B:
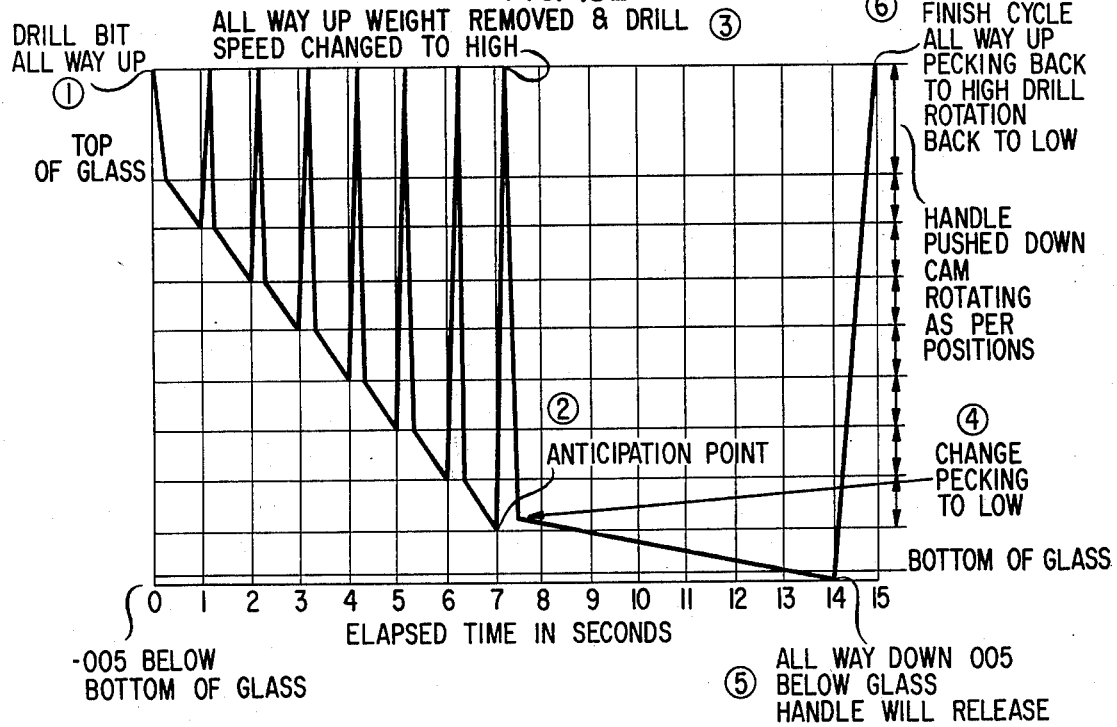
FIG. 15B is a plot against time of the pecking excursions of the drill at progressive points in the drilling cycle.

The drill bit 106b proceeds to execute, say, seven pecking excursions, as shown in FIG. 15B, the cam simultaneously making seven complete rotations through reference points A, B, C and D. During each excursion, the drill bit 106b falls by gravity against the tension of weighted cable 116, until reference point P on cam 157 makes contact with roller 161 on cam follower 156 at point D, as shown in FIG. 14B, pulling down on cable 163, a motion which is mechanically translated to cable 118 through rack and pinion 112; cable 118 and rack and pinion 128 then causing drill bit 106b to be pulled up. The function of the weights 187a, 187b is to provide tension on cable 116, which is translated through rack and pinion 128 into a preselected constant pressure on the drill bit 106b, which is typically of the order of 8 ounces for a 1/16 inch diameter drill hole.

Step 2

Figure 14C:
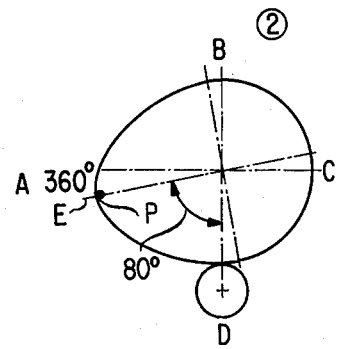
Figure 14D:
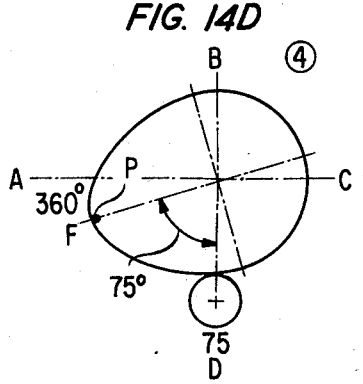

When reference point P on cam 157 reaches the anticipation point E (FIG. 14C) near completion of its eighth rotation, which is 80° beyond point D, as shown in FIG. 14C, drill bit 106b is at that moment at point (2), near the lowest point in its excursion, as shown in FIG. 15B. This causes the triggering of MS1 in drill head 107. Operation of MS1 applies ground to RS1, causing it to be thereby energized, and connect power to MS2 to make the latter ready for operation during the next rotation.

Step 3

As cam 157 rotates to the position where reference point P is again at point D, as shown in FIG. 14B, microswitch MS2 is actuated by the flat on drive shaft 154a. At this time, drill bit 106b is again withdrawn to its maximum vertical position, shown as ③ in FIG. 15B.

Operation of MS2 causes the following functions to be performed:

a. Hub 185, including weights 187a, 187b, is pulled off of cable 179 by the operation of solenoid 176 (see FIG. 7), reducing the tension on cable 116;

b. The wiper on switch 223 is switched from Ⓑ to Ⓒ (see FIG. 8), increasing the drilling speed to "high", which in the present instance may be 22,000 revolutions per minute;

c. Power is applied to microswitch MS3 (FIG. 10) to ready it for subsequent operation; and d. Drill bit 106b continues down at the initial high pecking rate to point ④ as shown in FIG. 15B.

Step 4

At position ④ reference point P on cam 157 is at point F (FIG. 14D), 75° in a clockwise direction from point D, and 5° ahead of E, triggering point for MS1. At point ④ microswitch MS3 is triggered by a corresponding flat on adjustable cam 157a on the extension 154a of cam 157 drive shaft to perform two functions:

a. The pecking motion is reduced to a very low speed at which the drill bit 106b is barely moving vertically downward; and b. Power is applied to microswitch MS4 for subsequent operation.

During this part of the cycle, the rotational speed of the drill remains at 22,000 revolutions per minute.

Step 5

Figure 14E:
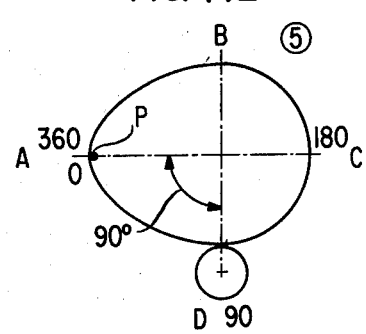

From point ④ to point ⑤ as shown in FIG. 15B, the drill bit 106b takes 16 seconds to pass through the final 10 mils of the glass workpiece 130, and a further distance of five mils below the surface (FIG. 15A). During this period, cam 157 slowly rotates to a position in which reference point P coincides with point A, as shown in FIG. 14E.

Step 6

Figure 12G:
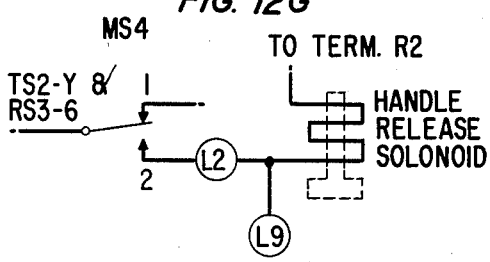
Figure 12H:
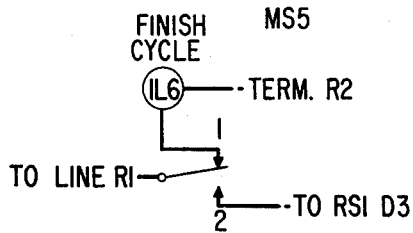
Figure 12I:
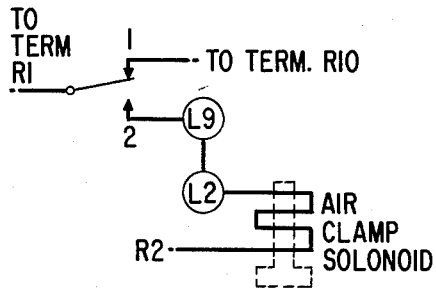

Microswitch MS4 is triggered at position ⑤ of the cam (FIG. 14E), causing the following functions to be performed:

a. Handle release solenoid S1 is actuated (FIGS. 10 and 12G). This releases the spring solenoid so that handle 120 is returned to "up" position and the pecking control for drill bit 106b is pulled away from the system operated by cam 157.

Step 7

Release of handle 120 operates microswitch MS5 (FIGS. 10, 12H), to perform the following functions:

a. To light signal light IL6 on control panel 105 (FIG. 16);

b. Solenoid 176 is deenergized, dropping core 184, including weights 187a, 187b, onto the surface of hub 188, reapplying weights to series connected cables 179 and 116. Drill bit 106b is pulled up to the maximum vertical height at point 6, as shown in FIG. 15B. Meanwhile, cam 157 moves to position shown in FIG. 14B, at which reference point P is at point D;

c. Pecking speed is reset at "high" through release of relay RS3; and d. Drill speed is reset at "low" through release of relay RS2.

After the signal light IL6 on control panel 105 indicates that the drilling operation has been completed, the operator actuates pneumatic foot pedal 152, which releases the locking members 137a, 137b, releasing the workpiece 130.

It will be understood that in an alternative arrangement, the pneumatic latching means for the workpiece can be alternatively actuated by solenoid means at the beginning and end of the drilling operation, under control of microswitch means on handle 120, or associated with one of the other drill components when moved in and out of rest position.

With further reference to FIG. 4B of the drawings, the rotary motor 191 (FIG. 8), which is physically housed in 191a, is mechanically coupled to rotate drive shaft 137 in sleeve 129 by any means well-known in the art, such as the belt system 246.

With reference to FIG. 13, the solid state pecking motor control circuit there indicated functions in a manner somewhat similar to the rotary motor control circuit shown in FIG. 8, to derive alternating current from a conventional source and convert the same to direct current, which is applied across a conventional potential divider to drive the pecking motor indicated in FIG. 18A. In the automatic mode, the output from the potential divider is shifted when it is necessary to shift the pecking motor speed from speed "one" to speed "two" (as set by dials 225 and 226 on panel 105) by operation of the contacts ⑫,⑧ and ⑪,⑦ of relay RS3. (See FIG. 10) The solid state control circuit of FIG. 13 is preferably of a circuit board type sold under the catalog description KBDM-11 CONTROL, as manufactured by KB Electronics, Inc., New York, N.Y. 11234.

With further reference to FIG. 16, showing control panel 105, it will be understood that selection between the automatic mode and the preset mode is made by the setting of toggle switch TS2. The automatic mode has now been described. In accordance with operation of the preset mode, the relay operation is such that the speed of rotation of drill bit 106b and the pecking speed thereof, remain unchanged for the entire drilling operation; and the drill bit 106b passes completely through the workpiece, or to a preset depth, without change in speed.

It will be further understood by those skilled in the art that there are numerous variations and modifications which could be applied to the embodiment disclosed. For one example, referring to FIGS. 4A, 4B, it will be understood that in view of the double-ended, symmetrical shape of the retaining pins, which is shown with reference to FIG. 4B, the clamping system can be used reversibly. Inasmuch as these pins are disposed to protrude symmetrically on either face of clamp plate 131, it will be understood that in accordance with one option the latter can be inverted for a double drilling operation, in which the workpiece 130 can be drilled through from opposite sides for the purpose of substantially eliminating any chance of breakout.

Although the present embodiment has been described in detail for the purposes of illustrating the present invention, it will be understood that this invention is not limited to the specific structures or arrangements shown, but only by the scope of the appended claims.

I claim:

1. A drill system which operates in accordance with a preselected program to drill an opening or indentation in a frangible workpiece which comprises in combination:
   a work surface,
   means operable to clamp said workpiece on said work surface,
   a rotary drill comprising a drill bit disposed above said work surface constructed and arranged to drill said opening or indentation in said workpiece,
   a first driving means operable to drive said drill bit to rotate about its axis,
   dual control means operable to impose a pecking action on said drill bit in relation to said work surface comprising:
     a first gravity operated pecking control means including weights mechanically coupled to impose a preselected pressure on said drill bit in relation to said work surface,
     a second pecking control means mechanically coupled to said first control means, and including a master cam and a second driving means operable to drive said master cam to rotate to control the cycle of the pecking motion of said drill bit,
   and relay means responsive at preselected points in the rotation of said cam and the excursions of said drill bit to initiate one or more functions in accordance with said program,
   said relay means being constructed and arranged to operate when said drill bit progresses within a preset distance from the breakout point of said frangible workpiece to trigger said relay means:
     a. to shift the speed of rotation of said first driving means from an initial low rate to a high rate,
     b. in synchronism with (a) to remove weights on said first pecking control means to lessen the pressure on the said drill bit for the final descent thereof into said workpiece,
     c. at a point in the final descent of the drill bit just prior to contact with the workpiece, to shift the speed of rotation of said master cam from a brisk initial rate to a relatively low rate for the critical breakthrough period at the end of said program, and
     d. to return said drill system, including said drill bit, to condition for reoperation.

2. The combination in accordance with claim 1 wherein said system includes manually operable latching means constructed to engage and disengage the mechanical coupling between said first pecking control means and said second pecking control means.

3. The combination in accordance with claim 1 wherein said work surface includes a liquid container wherein said workpiece is immersed in a shallow liquid bath.

4. The combination in accordance with claim 2 wherein said means operable to clamp said work on said work surface includes pneumatically inflatable clamping means for securing said workpiece in position in relation to said work surface, said clamping means including:
   a clamping plate having at least one slot terminating adjacent an edge of said workpiece,
   a part locator having a movable element including contacting means disposed to slide in said slot toward and away from contacting relation with said workpiece, an element constructed to be secured in fixed relation to said movable element in said slot, and means comprising an inflatable hose disposed in pressure transmitting relation between said movable element and said fixed element,
   a source of high pressure fluid connected to said hose,
   means for actuating said part locator in response to a change in fluid pressure in said hose to urge the contacting means of said movable element in contact with the edge of said workpiece.

5. The combination in accordance with claim 4 wherein said fluid is air derived from a source of compressed air, and wherein said means comprising an inflatable hose comprises a pair of hoses, one normally inflated and one normally deflated.

6. The combination in accordance with claim 5 wherein said actuating means comprises a foot pedal constructed to energize a valve to release compressed air into said normally deflated hose, and to simultaneously deflate said normally inflated hose.

7. The combination in accordance with claim 4 wherein said actuating means comprises a solenoid operated by said relay means at a preselected point in said program.

8. The combination in accordance with claim 2 wherein said first pecking control means includes an adjustable stop mechanism which operates said relay means at a preselected position in the downward excursion of said drill bit to release said manually operable latching means.

9. The combination in accordance with claim 8 wherein said first gravity operated pecking control means comprises a rack and pinion for raising and lowering said drill bit,
   a shaft coaxial with and rotatable in synchronism with said pinion,
   said stop mechanism comprising in combination depth adjusting means including a worm having a worm gear coaxial with said shaft,
   a secondary pinion angularly adjustable and rotatable on said shaft in mating relation with said worm gear,
   said secondary pinion and said worm gear each having a stop thereon, said stops directed toward one another and disposed in overlapping planes of rotation, whereby the stop on said secondary pinion is constructed to rotate toward and engage the stop on said worm gear while said drill bit descends, and to subsequently interlock and rotate together through a small angle, thereby moving said worm forward a preselected lateral distance,
   said worm carrying at its inner end axially disposed contact means,
   a microswitch disposed in the path of said contact means for operation by said contact means,
   means for adjusting the position of said microswitch relative to said contact means,
   said microswitch connected in circuit relation with said relay means to actuate means for returning said drill including said drill bit for reoperation.

10. The combination in accordance with claim 2 wherein the means operable to drive said master cam to rotate comprises a motor and a shaft, and the actuating means for said relay means comprises at least one microswitch having a contacting brush riding on said shaft,
    said shaft machined to provide a flat in a selected area on its periphery, whereby said microswitch is actuated when said brush contacts said flat at a preselected point in the rotation of said master cam.

11. A method of drilling holes or indentations in a frangible workpiece in accordance with a preselected program which comprises the steps of:

clamping said frangible workpiece on a work surface beneath a drill having a rotatable drill bit, driving said drill bit to rotate about its axis, operating dual controls to impose a pecking motion in said drill bit in relation to said work surface, wherein one of said dual controls raises and lowers said drill bit in vertical motion applying pressure in relation to said work surface by a combination of gravity and the addition and subtraction of weights, and the other of said dual controls drives a master cam to rotate in mechanically coupled relation to modulate the vertical motion of said drill bit, the rotation of said cam and the excursions of said drill bit initiating relay operations to perform one or more functions in accordance with said program, wherein the said relay operations include the following functions:

a. shifting the speed of rotation of said drill bit about its axis from an initial low rate to a high rate, b. in synchronism with (a), subtracting weights in said one dual control to lessen pressure on the drill bit for its final descent into said workpiece, c. at a point in the final descent of said drill bit just prior to contact with said workpiece, shifting the speed of rotation of said master cam from a brisk initial rate to a relatively low rate for the critical breakthrough period at the end of said program, and d. returning said drill including said drill bit to condition for reoperation.

12. The method in accordance with claim 11 which comprises immersing said workpiece in a water bath during said drilling operation.

13. The method in accordance with claim 11 which comprises clamping said workpiece on said work surface pneumatically by inflating means to slidably move one or more contact means in locking relation to said workpiece.

14. The method in accordance with claim 13 wherein compressed air is used for pneumatically inflating and deflating individuals of a pair of hoses in alternation for operating and releasing a clamp against said workpiece.

15. The method in accordance with claim 14 which comprises energizing and deenergizing a solenoid at selected points in said program in accordance with said initiating relay operations.

16. The method in accordance with claim 11 wherein said one of said dual pecking controls actuates a stop mechanism to operate relays at a preselected position in the downward excursion of said drill bit to release a manually operable latch.